（12） United States Patent
Yuan et al.

(10) Patent No.: US 10,911,565 B2
(45) Date of Patent: Feb. 2, 2021

(54) METHOD, DEVICE AND SYSTEM FOR ASSOCIATING A SERVICE ACCOUNT

(71) Applicant: BANMA ZHIXING NETWORK (HONGKONG) CO., LIMITED, Kowloon (HK)

(72) Inventors: Zhijun Yuan, Hangzhou (CN); Xuyan Chi, Hangzhou (CN); Kan Xu, Hangzhou (CN)

(73) Assignee: BANMA ZHIXING NETWORK (HONGKONG) CO., LIMITED, Kowloon (HK)

( * ) Notice: Subject to any disclaimer, the term of this patent is extended or adjusted under 35 U.S.C. 154(b) by 147 days.

(21) Appl. No.: 15/950,915

(22) Filed: Apr. 11, 2018

(65) Prior Publication Data

US 2018/0343318 A1    Nov. 29, 2018

Related U.S. Application Data

(63) Continuation-in-part of application No. PCT/CN2016/101641, filed on Oct. 10, 2016.

(30) Foreign Application Priority Data

Oct. 14, 2015 (CN) .......................... 2015 1 0664719

(51) Int. Cl.
*G06F 15/177* (2006.01)
*H04L 29/08* (2006.01)
(Continued)

(52) U.S. Cl.
CPC ............ *H04L 67/306* (2013.01); *G06F 9/542* (2013.01); *H04L 67/20* (2013.01); *H04L 67/34* (2013.01); *H04M 1/72522* (2013.01)

(58) Field of Classification Search
CPC ....... H04L 67/306; H04L 67/20; H04L 67/34; G06F 9/542; H04M 1/72522
(Continued)

(56) References Cited

U.S. PATENT DOCUMENTS

2003/0038978 A1* 2/2003 Oashi .................. G06Q 10/107
358/402
2007/0130541 A1* 6/2007 Louch ................. G06F 3/04817
715/804
(Continued)

FOREIGN PATENT DOCUMENTS

CN          103841202          6/2014
CN          104618364          5/2015
(Continued)

*Primary Examiner* — Alan S Chou
(74) *Attorney, Agent, or Firm* — Van Pelt, Yi & James LLP

(57) ABSTRACT

Embodiments of the present application relate to a method, device, and system for associating a service account. The method includes obtaining, by one or more processors, event data in connection with execution of an application on a terminal, wherein the event data corresponds to one or more trigger types, determining, by one or more processors, whether the event data corresponds to a predefined trigger data, and in response to determining that the event data corresponds to the predefined trigger data, providing, by one or more processors, service account-association information corresponding to the predefined trigger data.

19 Claims, 7 Drawing Sheets

(51) Int. Cl.
*G06F 9/54* (2006.01)
*H04M 1/725* (2021.01)
(58) Field of Classification Search
USPC .......................................... 709/222
See application file for complete search history.

(56) References Cited

U.S. PATENT DOCUMENTS

| | | | | |
|---|---|---|---|---|
| 2009/0005008 | A1* | 1/2009 | Son | H04L 51/14 |
| | | | | 455/412.1 |
| 2015/0294342 | A1* | 10/2015 | Hertel | G06Q 30/0226 |
| | | | | 705/14.27 |
| 2016/0019103 | A1* | 1/2016 | Basra | H04W 4/06 |
| | | | | 709/223 |
| 2016/0048698 | A1* | 2/2016 | Sahu | G06F 16/21 |
| | | | | 707/783 |
| 2017/0070384 | A1* | 3/2017 | Wistow | H04L 41/22 |

FOREIGN PATENT DOCUMENTS

| | | |
|---|---|---|
| CN | 104639513 | 5/2015 |
| WO | 2014176748 | 11/2014 |

\* cited by examiner

METHOD, DEVICE AND SYSTEM FOR ASSOCIATING A SERVICE ACCOUNT

CROSS REFERENCE TO OTHER APPLICATIONS

This application is a continuation-in-part of and claims priority to International (PCT) Application No. PCT/CN2016/101641 entitled SERVICE ACCOUNT ASSOCIATION METHOD, DEVICE AND SYSTEM AND TERMINAL DEVICE, filed Oct. 10, 2016 which is incorporated herein by reference for all purposes, which claims priority to China Application No. 201510664719.X entitled METHOD, MEANS, SYSTEM, AND TERMINAL DEVICE FOR ASSOCIATING SERVICE ACCOUNTS, filed Oct. 14, 2015 which is incorporated herein by reference for all purposes.

FIELD OF THE INVENTION

The present application relates to a field of communications technology. In particular, the present application relates to a method, device, and system, for associating service accounts.

BACKGROUND OF THE INVENTION

More and more service providers are choosing to provide users with services in the form of service accounts on public platforms. Examples of public platforms on which service accounts are provided include the WeChat® and Alipay® public service platforms. Users are associated with service accounts on the public platform and can use services provided by the public platforms after the users are associated with a service account. The service accounts generally provide services with greater speed and convenience than installed apps. For example, a service account can be a widget, a plug-in, or a mini-program for another application (e.g., Facebook Messenger, etc.). Accordingly, the service account is not an account but a mini program that can provide a service.

In the related art, generally two methods are used to associate users with service accounts on service account platforms. According to the first method, the service account is directly searched (e.g., by the user typing in the service account identifier) on the public platform and the desired service account is selected from among a large volume of service accounts (e.g., that are determined according to the search on the public platform), and the selected service account is associated with the user. According to the second method, a service provider provides a Quick Response (QR) code and the QR code is scanned. For example, the user is generally required to manually open the scanning function on the public platform and scan the QR code provided by the service provider.

The problem with the above-described method for approaches to associate service accounts is cumbersome and reduces user operating efficiency. Accordingly, consumers may be less likely to consume services on the public platforms.

BRIEF DESCRIPTION OF THE DRAWINGS

The aspects and advantages of the present invention, whether described above or added, become obvious and easy to understand in descriptions of embodiments provided below in light of the drawings, as follows.

DETAILED DESCRIPTION

Figure 1:
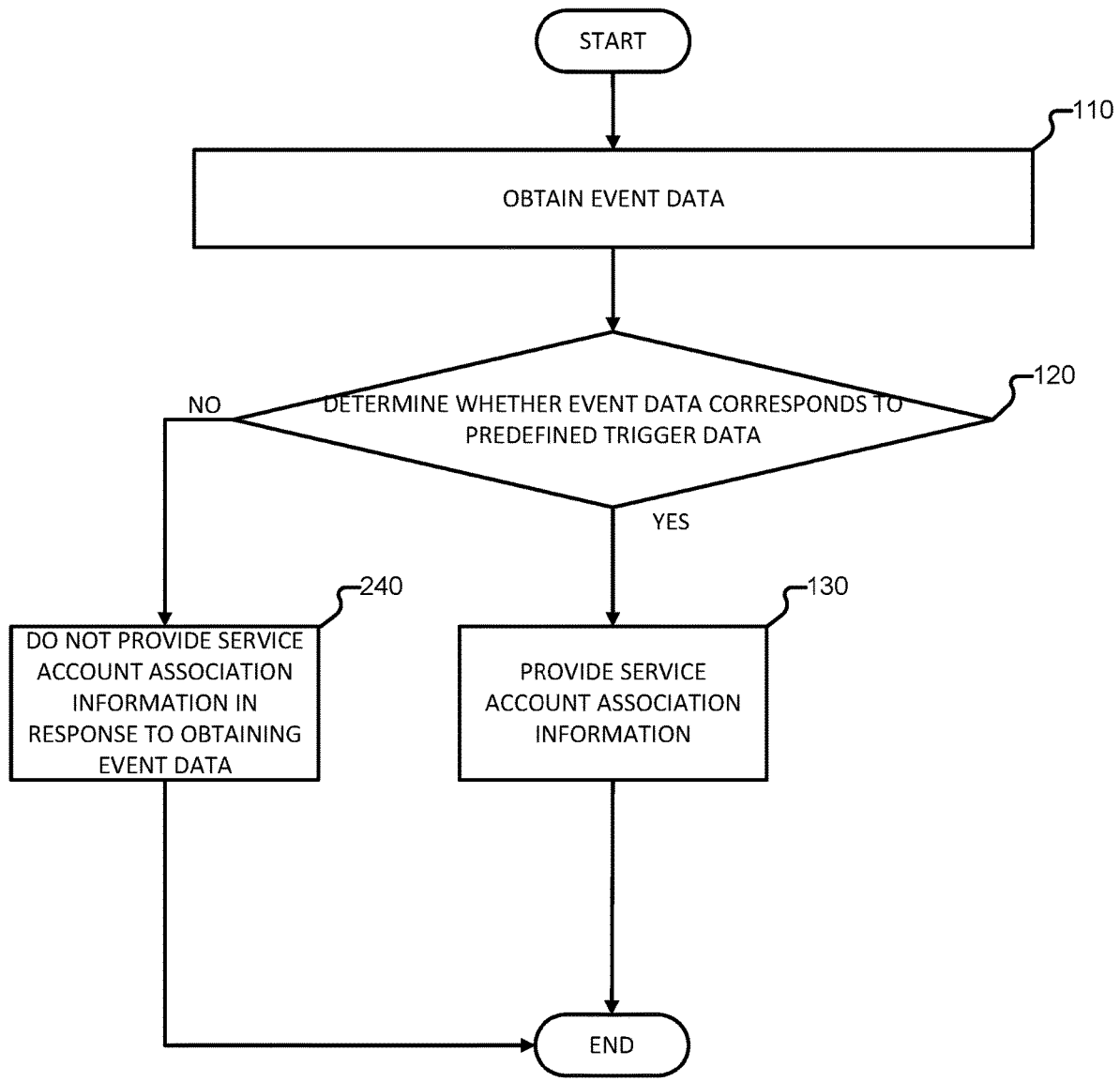
FIG. 1 is a flowchart of method for associating a service account according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the present application are described in detail below. Examples of the embodiments are presented in the attached drawings, wherein identifying numbers that are the same or similar throughout indicate same or similar elements or elements with the same or similar functions. The embodiments that are described below with reference to the drawings are illustrative. Their purpose is to explain the present application and cannot be understood as limiting the present application.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, an information centers (such as one or more services providing information such as traffic or weather, etc.) a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

As used herein a service account can correspond to a mini-program, widget, or plug for another application. For example, a service account can be a "sub-application" that operates within an ecosystem of another application (e.g., Facebook Messenger, WeChat, etc.).

The present application embodiments of the service account-associating method, means, system, and terminal device are described below with reference to the drawings.

FIG. 1 is a flowchart of method for associating a service account according to various embodiments of the present disclosure.

Referring to FIG. 1, process 100 is provided. Process 100 can be implemented in connection with process 200 of FIG. 2, interface 300 of FIG. 3A, interface 350 of FIG. 3B, and/or process 400. Process 100 can be implemented at least in part by system 500 of FIG. 5 and/or computer system 600 of FIG. 6. In some embodiments, process 100 is implemented on a terminal such as such as a mobile phone, a tablet computer, a smart wearable device, or a computer.

At 110, event data is obtained. The event data can be obtained in connection with occurrence of a triggering event. For example, the event data can be obtained in response to a triggering event that occurs while an application is running on a terminal, using an operating system call, an application programming interface, a library function, or the like. The triggering event (e.g., the occurrence of which can invoke obtaining the event data) can comprise a selection of event data being displayed, a click (or within a predefined proximity) of event data being displayed, etc. In the case of an instant messaging application, etc., the triggering event can correspond to the receipt of a communication (e.g., information) from another terminal or user. The event data can be associated with a service account. A service corresponding to the event data can be pushed or provided to the user or the terminal.

In some embodiments, the application running on the terminal comprises an application in a terminal device operating system, such as a calling application, a messaging application, a calendar application, or the like. In some embodiments, the application running on the terminal comprises an application which the user downloads and installs, such as an instant messaging application, a media playback application, a map navigation application, or the like.

The event data can correspond to one or more trigger types. For example, the event data can indicate the one or more trigger types with which the event data is associated. As another example, the one or more trigger types can be determined based at least in part on a formatting of the event data. As another example, the event data can comprise, or otherwise be associated with, metadata that indicates the one or more trigger types to which the event data corresponds.

According to various embodiments, a trigger type indicates the type of information that triggers service account association events. Information such as event data can correspond to various forms of a trigger type, which are not limited by the present disclosure. Trigger types include: telephone number type, web address type, keyword type, date type, location type (e.g., physical location, geographic location, etc.), email type, user id type, logo type, etc. Trigger types can be predefined or pre-registered by application providers among installed applications. Event data corresponding to preset trigger types can be obtained according to various methods, and the particular method used in connection with obtaining the event can be selected according the particular actual application (e.g., the application developer can define one or more methods for obtaining event data). The examples below provide a description of some of the methods by which event data is obtained. Various other methods for obtaining event data are possible:

Method 1: Obtain Data by Processing Real-Time Information of an Application.

Real-time information can be obtained in connection with the running of an application. For example, the operating system obtains the real-time information. The real-time information can be obtained by the application, or centrally by the terminal such as via the operating system or a process running on the process. The real-time information can correspond to information associated with interactions in various application processes used by the user. For example, the real-time information content in the application depends on the application that the user is using. For example, the real-time information content in the application is based at least in part on the manner in which the user is using the application (e.g., based on user interactions with the applications such as an input submitted by the user to the application, etc.). For example, if the user uses an instant messaging application, the real-time information generated in connection with the use of the instant messaging application, can comprise chat content. As another example, if the user uses a search engine application, real-time information generated in connection with the use of the search engine application comprises the search information that is entered and/or the search results found based on the search information. The real-time information associated with an application can comprise information that is generated by the application, information that is obtained by the application, etc.

The real-time information associated with an application can correspond to one or more trigger types. The one or more trigger types to which the real-time information corresponds can be determined by analyzing and/or processing the real-time information. For example, a preset screening process can be used to filter the real-time information and event data corresponding to the preset trigger type can be obtained (e.g., based on the filtering of the real-time information). The use of a preset screening process to filter the real-time information conserves processing resources. As an example, the preset screening process comprises at least one of the following: regular expression processing, semantic analysis processing, and cluster analysis processing. In some embodiments, one or more key words can be obtained from filtering the real-time information.

Method 2: Parallel-Process Interface Parameters Sent by Various Applications Through Interfaces with Various Applications.

Various applications can communicate with each other and/or with an operating system via one or more interfaces. For example, various interfaces can be configured for various applications. An application can establish a connection with another application via an interface. An application can be configured (e.g., instructed) to independently process real-time information generated or obtained by the application. For example, one or more applications can each process real-time information respectively generated or obtained by the one or more applications. The operating system of the terminal can cause or invoke the one or more applications to process the real-time information. For example, the operating system can instruct the one or more applications to process the real-time information via an API between the operating system and the one or more applications. The application obtains even data corresponding to one or more trigger types in response to the processing of the real-time information. The obtained event data corresponding to the one or more trigger types is communicated to one or more other applications or the operating system of the terminal via the interface corresponding to the application. For example, the event data is embedded in the interface parameters and sent through the interface. Parallel processing is possible with this method, which raises processing efficiency. For example, parallel processing is possible because one or more applications each process its own event data (e.g., event data generated or obtained by the corresponding one or more applications).

According to various embodiments, some trigger types may not appear in some applications. As an example, a trigger type will not appear in an application if the application does not support the trigger type. Therefore, to raise processing efficiency and conserve processing resources, processing trigger types corresponding to the application can be determined according to reference information corresponding to a particular application. Reference information can include: historical information (e.g., in user logs, etc.), or attribute information of applications, information associated with user settings or preferences. Examples of reference information are provided below. Other forms of reference information are possible.

The reference information can be analyzed or processed to determine one or more trigger types corresponding to an application or to event data generated or obtained by the application. For example, the one or more trigger types can be determined based at least in part on one or more characteristics associated with the reference information. In some embodiments, the terminal analyzes or processes the reference information. For example, the application corresponding to the reference information analyzes or processes the reference information. As another example, another application, the operating system, or another process analyzes or processes the reference information corresponding to another application. The one or more characteristics associated with the reference information can include formatting, character type, character type proportion, length, size, attributes, etc.

A mapping of characteristics associated with reference information to trigger types can be stored. For example, the terminal can locally store the mapping of characteristics associated with reference information to trigger types. As another example, the terminal can access a remotely stored (e.g., on a server) mapping of characteristics associated with reference information to trigger types. In some embodiments, an application stores a mapping of characteristics associated with reference information to trigger types, and the mapping stored by the application can be specific to the application (e.g., each application can store its own mapping of characteristics associated with reference information to trigger types). The terminal (or application) can use the mapping of characteristics associated with reference information to trigger types as a lookup to determine one or more trigger types corresponding to the application (or associated event data). For example, in response to determining the one or more characteristics corresponding to the reference information, the terminal (e.g., the application) queries the mapping of characteristics associated with reference information to trigger types to determine the trigger types corresponding to the application (or the event data associated with the application). The mapping of characteristics associated with reference information to trigger types can be preset by an application developer. The mapping characteristics associated with reference information to trigger types can be updated based on historical information or contextual information associated with an application (e.g., by determining a manner by which the information is being used).

In the case of reference information being historical information (e.g., in a user log, etc.), character type proportions can be obtained by analyzing the historical information. The character type proportions can be used in connection with determining the one or more trigger types associated with the application. The terminal can compare the character type proportions to one or more thresholds that are indicative of a trigger type. If the proportions of the numerical type and the text type in the historical information both exceed a threshold value, then the trigger types corresponding to this application are the telephone number type and the keyword type. For example, if a character type proportion exceeds a threshold, a trigger type corresponding to the trigger will be triggered. In the case of a phone number, if a number type proportion exceeds a threshold, a phone number trigger type will be triggered.

In the case of the reference information being application attribute information, the attribute information can be obtained from metadata associated with the application, information associated with the application that indicates one or more attributes of the application, a mapping of applications to attributes, etc. The terminal can use the application attribute information in connection with determining one or more trigger types corresponding to the application (or the event data generated or obtained by the application). For example, if application attribute information indicates that an application is a calling application, then the trigger type is determined to be the telephone number type.

The methods described above may be selected according to actual conditions. For example, in the case that fewer applications are involved, the Method 1 for obtaining data by processing real-time information of an application is implemented. As another example, in the case that more applications are involved, Method 2 for parallel-process interface parameters sent by various applications through interfaces with various applications is implemented.

The above method whereby the trigger type corresponding to the application is determined according to each app's reference information is given as an example only. According to various embodiments, trigger types corresponding to applications is determined in other manners. For example, the trigger type corresponding to the application is determined according to application type. If the application is a calling application, then the trigger type can be determined (e.g., deemed) to be a telephone number type. If the application is a messaging application, then the trigger type can be determined to be a keyword type. If the application is a mapping application or a map navigation application, then the trigger type can be determined to be a location type or an address type. According to various embodiments, a trigger type corresponding to the application is determined according to application function. If the application is a web browser (e.g., for browsing a web page) supporting a search function, then the trigger type can be determined to be a web address type.

At 120, a determination is made of whether the event data corresponds to predefined trigger data. In some embodiments, the terminal determines whether the event data corresponds to the trigger data. An application such as the application associated with the event data (e.g., the application that generated or obtained the event data) can determine whether the event data corresponds to trigger data.

The predefined trigger data can correspond to trigger data matching the one or more trigger types associated with the event data.

In some embodiments, the determination of whether data corresponds to predefined trigger data is based at least in part on a mapping of event data to trigger data. In some embodiments, the determination of whether data corresponds to predefined trigger data is based at least in part on a mapping of trigger type to trigger data. The trigger type can be determined based on the event data such as using a mapping of event data to trigger type.

A mapping of trigger type to trigger data, mapping of event data to trigger data, and/or a mapping of event data to trigger type can be stored. For example, the terminal can locally store the mapping of trigger type to trigger data, mapping of event data to trigger data, and/or a mapping of event data to trigger type. As another example, the terminal can access a remotely stored (e.g., on a server) mapping of trigger type to trigger data, mapping of event data to trigger data, and/or a mapping of event data to trigger type.

As discussed above, mapping relationships can be used in connection with determining whether the event data corresponds to a predefined trigger data. The mapping relationships can comprise: correspondences between trigger types and trigger data. For example, in the case that the trigger type is telephone number type, the corresponding trigger data is "95555" and "114." As another example, in the case that the trigger type is web address type, the corresponding trigger data is "www.abc.com," etc. As another example, in the case that the trigger type is keyword type, the corresponding trigger data is "delicacy," "group purchase," and so on. The source of the association mapping relationship can be integrated in the application program in advance by the service provider. In addition, or alternatively, the association mapping relationship can be downloaded by the terminal from a third party platform, such as a cloud platform. In this approach, the third party service platform can update the association-mapping relationship content over time. The terminal can synchronously update the mapping relationship at any time.

The pre-stored association mapping relationships serve as a basis to determine whether the acquired event data is trigger data corresponding to the trigger type. The association mapping relationships can be described using more than one programming language. Therefore, various methods for determining whether event data is trigger data can be implemented. For example, if the association mapping relationships are synchronously downloaded from a third party service platform, the association mapping relationship content may be updated at any time, with better flexibility. Generally, the dynamic language JavaScript is used for compilation, in which case the terminal uses V8 or JavaScriptCore, which have JavaScript analysis and execution capabilities. JS is used to execute the JS script corresponding to the engine execution rule so as to determine whether the obtained event data is trigger data corresponding to the trigger type.

In response to determining that the event data corresponds to predefined trigger data at 120, process 100 proceeds to 130. At 130, in response to determining that the event data corresponds to trigger data, service account association information is provided. For example, the service account association information is provided in the form of a link to a web page to the service, or in a QR code corresponding to the service. As an example, the service account association information that is provided corresponds to the predefined trigger data (e.g., to which the event data corresponds). In some embodiments, the terminal provides the service account association information to a user of the terminal. For example, the terminal displays the service account association information. In some embodiments, the terminal provides the service account association information to one or more servers (e.g., one or more servers associated with a service platform such as a public platform). The terminal can communicate the service account association information to the one or more servers via a network such as the Internet. The one or more servers can use the service account association information to provide the terminal or the application with one or more services. In some embodiments, the terminal provides the service account association information to one or more applications running thereon.

In some embodiments, the service account association information is obtained based at least in part on the trigger data. For example, in response to determining that the event data corresponds to predefined trigger data, the terminal obtains the service account association information corresponding to the trigger data. In response to obtaining the service account association information, the service account association is provided (e.g., to the user).

In some embodiments, if the obtained event data is the trigger data, then service account association information corresponding to the trigger data is provided. Please understand that the service account is the vehicle whereby the service provider provides service on a public platform. Examples include the authentication service numbers on the WeChat, Alipay, and other public platforms. The terminal can use the associated service account on the public platform to obtain information pushed by the public platform or the corresponding service provider, or the service provided by the public platform or corresponding service provider.

Service account association information is a medium channel for guiding the user to associate the terminal with a service account of a service provided by one or more severs (e.g., a platform). There are many forms of service account association information, concerning which the present disclosure imposes no limits. Examples of service account association information include: service account QR code icons, service account links, tokens, and icons for adding service accounts. The service account association information comprises information with which one or more servers associate the terminal with a service account (e.g., a user account). For example, the service account association terminal can be used to register the terminal or the user thereof. The service account information can comprise a terminal identifier, a user identifier, an account identifier, a terminal address, a terminal phone number, a location, etc.

According to various embodiments, a mapping of service account association information and trigger data is stored. For example, the terminal can locally store the mapping of service account association information to trigger data. As another example, the terminal can access a remotely stored (e.g., on a server) mapping of service account association information to trigger data. The mapping of service account association information to trigger data can be stored on a third party platform such as a cloud platform. Thus, after event data is determined to correspond to the predefined trigger data, the corresponding service account association information can be obtained from the mapping of service account association information to trigger data.

The obtained service account association information corresponding to the trigger data is provided to the user. The service account association information can be provided according to various methods. As an example, the service account association information is provided by the application interface current used by the user. As another example, the service account association information is provided by a message interface (e.g., the message notification field of an operating system). The message interface can be configured before process 100 is implemented.

The terminal can obtain an input from a user that corresponds to an instruction to use the service account association information to associate the terminal or the application with a service account. The service account can correspond to an account associated with a service provided by one or more servers (e.g., a platform). In response to receiving the instruction to use the service account association information to associate the terminal or the application with a service account, the terminal (or the application running on the terminal) communicates a service account association setup instruction to one or more servers (e.g., via one or more networks). The one or more servers can be associated with a service such as a service provided by a public platform (e.g., a web service).

In response to determining that the event data does not correspond to predefined trigger data at 120, process 100 proceeds to 140. At 140, in response to determining that the event data does not correspond to trigger data, service account association information is not provided in response to obtaining the event data. In addition, or alternatively, in response to determining that the event data does not correspond to predefined trigger data at 120, process 100 ends.

In some embodiments, the service account is stored and managed by a web server.

In some embodiments, an application running on the terminal syncs with the web server to manage a service account for the user of the terminal.

According to various embodiments, event data corresponding to a preset trigger type is obtained while a user is using a terminal application. In response to obtaining the event data, a pre-stored association mapping relationships is used as a basis for determining whether the event data is trigger data corresponding to the trigger type. If the event data corresponds to the trigger data, then service account association information corresponding to the trigger data is provided. Thus, users can flexibly associate service accounts in real time while the use is using terminal apps. Various embodiments improve processing efficiency and user loyalty.

Figure 2:
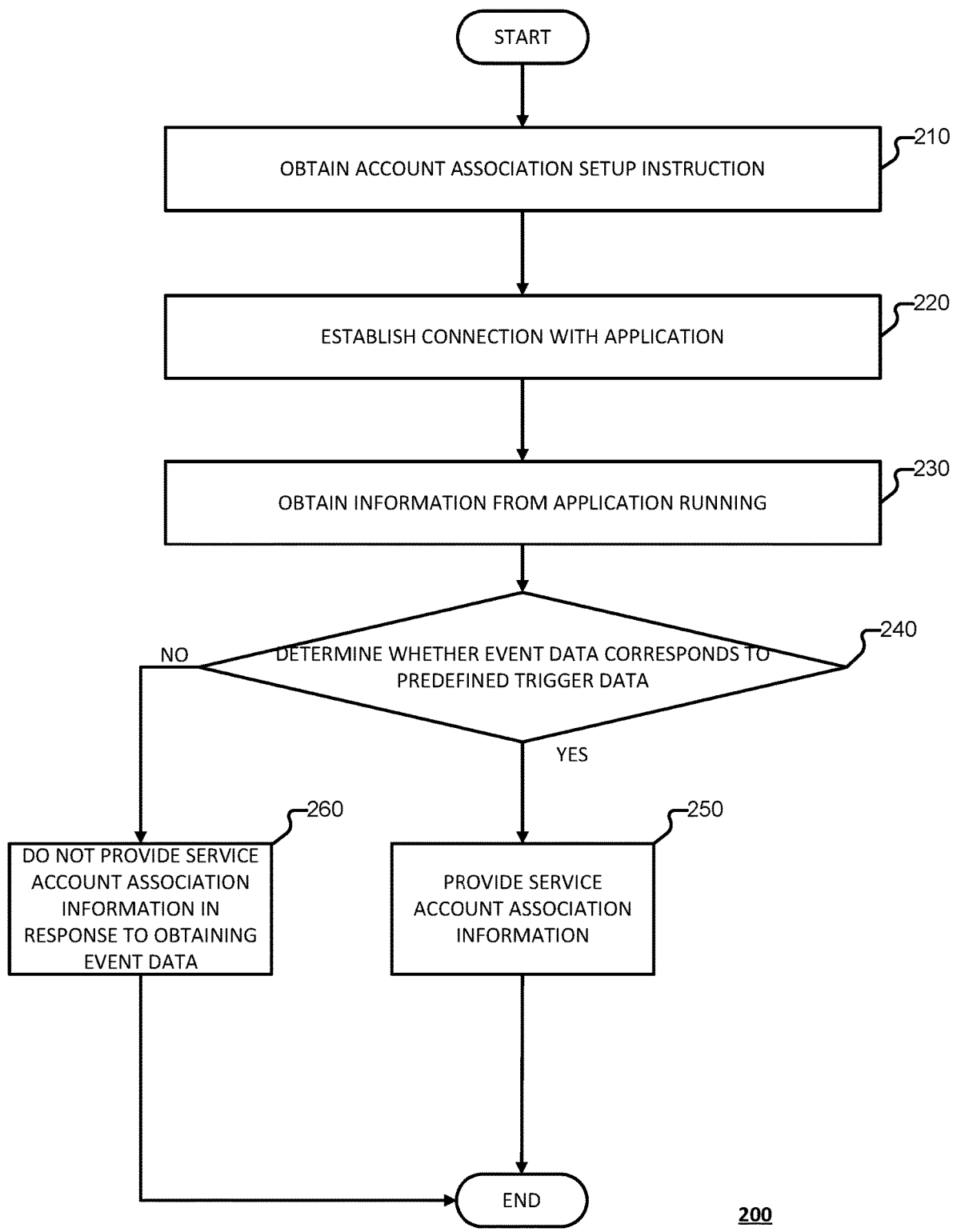
FIG. 2 is a flowchart of method for associating a service account according to various embodiments of the present disclosure.

FIG. 2 is a flowchart of method for associating a service account according to various embodiments of the present disclosure.

Referring to FIG. 2, process 200 is provided. Process 200 can be implemented in connection with process 100 of FIG. 1, interface 300 of FIG. 3A, interface 350 of FIG. 3B, and/or process 400. Process 100 can be implemented at least in part by system 500 of FIG. 5 and/or computer system 600 of FIG. 6. In some embodiments, process 100 is implemented on a terminal. The terminal can be a server. For example, the server is associated with a public platform, a software as a service, or another service. The server comprises one or more servers.

At 210, a service account association setup instruction is obtained. A server can obtain the service account association setup instruction from a terminal. For example, in response to a user input or another event at the terminal, the terminal can communicate the service account association setup instruction to the server via one or more networks. In some embodiments, an application running on the terminal communicates the service account association setup instruction to the server. As another example, the user input can be submitted to an interface provided by one or more servers, and the user input can correspond to a selection to a service account (e.g., that the user desires to receive). The terminal or the server can provide a setup interface via which the service account identifier is input (e.g., selected). The service account association setup instruction can obtained in connection with input of the service account identifier. For example, in response to input of the service account identifier to the setup interface, the service account association setup instruction is obtained (e.g., communicated to the server).

The service account association setup instruction comprises one or more identifiers. For example, the service account association setup instruction comprises a service account identifier. In some embodiments, the service account identifier corresponds to a program from which the service account association setup instruction is communicated. In some embodiments, the service account identifier corresponds to a program selected or provided by the user. For example, the user can provide an input (to the terminal) indicating a program to receive service (e.g., a service account associated with a service that the user indicates a desire to receive) or to be associated with a service.

Different users have different needs concerning services in need of processing. Therefore, to avoid wasting processing resources and to increase processing efficiency and flexibility, the user, after selecting the service account identifier in need of service account associating from the setup interface, sends a service account association setup instruction. The service account association setup instruction comprises: at least one service account identifier.

At 220, a connection is established with a program. The connection can be established between the application on the terminal and a program of the server. The program of the server can be associated with a service account. In response to receiving the service account association setup instruction, the connection is established with the program. The program with which the connection is established corresponds to the service account associated with the service account identifier comprised in (or otherwise associated with) the service account association setup instruction. The connection with the program can be established via a preset interface.

In response to the receiving of the service account association setup instruction sent by the user, the service account association setup instruction undergoes analysis to acquire at least one service account identifier, and a connection is established with a program corresponding to the service account identifier via a preset interface. The service account identifier can be extracted from the service account association setup instruction.

At 230, information is obtained in connection with running an application. In some embodiments, the application generates or obtains event data in connection with the application running. For example, in connection with a user using the application, the event data can be generated or obtained. The information that is obtained in connection with running an application can correspond to one or more interface parameters. In some embodiments, the obtaining of information in connection with the application running (e.g., while a user uses the application on the terminal) includes obtaining one or more interface parameters. The one or more interface parameters comprise event data. The terminal can obtain the one or more interface parameters in connection with running the application.

The event data can correspond to one or more trigger types. For example, the event data can indicate the one or more trigger types with which the event data is associated. As another example, the one or more trigger types can be determined based at least in part on a formatting of the event data. As another example, the event data can comprise, or otherwise be associated with, metadata that indicates the one or more trigger types to which the event data corresponds.

The event data can be obtained in connection with occurrence of a triggering event. For example, the event data can be obtained in response to a triggering event that occurs while an application is running on a terminal.

At 240, a determination is made of whether the event data corresponds to predefined trigger data. In some embodiments, the terminal determines whether the event data corresponds to the trigger data. An application such as the application associated with the event data (e.g., the application that generated or obtained the event data) can determine whether the event data corresponds to trigger data.

The predefined trigger data can correspond to trigger data matching the one or more trigger types associated with the event data.

In some embodiments, the determination of whether data corresponds to predefined trigger data is based at least in part on a mapping of event data to trigger data. In some embodiments, the determination of whether data corresponds to predefined trigger data is based at least in part on a mapping of trigger type to trigger data. The trigger type can be determined based on the event data such as using a mapping of event data to trigger type.

In response to determining that the event data corresponds to predefined trigger data at 240, process 200 proceeds to 250. At 250, in response to determining that the event data corresponds to trigger data, service account association information is provided. For example, the service account association information is comprised in a broadcast message. The broadcast message can be configured based at least in part on the service account association information. The broadcast can be sent by the operating system of the terminal. For example, the terminal can use an operating system mechanism (e.g., Android Broadcast on Android operating systems) to broadcast the service account association information. For example, the service account association information can be embedded in the broadcast message. The embedding of the service account association information can be in accordance with a predefined method or protocol. The broadcast message can be provided to the user. For example, the broadcast message can be communicated to user via one or more interfaces. In some embodiments, the broadcast message is displayed on a user interface. In some embodiments, the broadcast message is communicated to a terminal associated with the user.

Process 200 can implement Method 2 parallel-process interface parameters sent by various applications through interfaces with various applications that is described above to obtain the event data corresponding to the preset trigger type. The one or more interface parameters are then analyzed to obtain event data. Pre-stored association mapping relationships can serve as a basis for determining whether the obtained event data is the trigger data corresponding to the trigger type. As an example, in Method 2, each application on the terminal will collect the event data independently, and send the event data to server via the interface independently.

If the obtained event data is trigger data, then service account association information corresponding to the trigger data is obtained, and the service account association information is embedded in an extension field of the broadcast message and communicated to user.

Figure 3A:
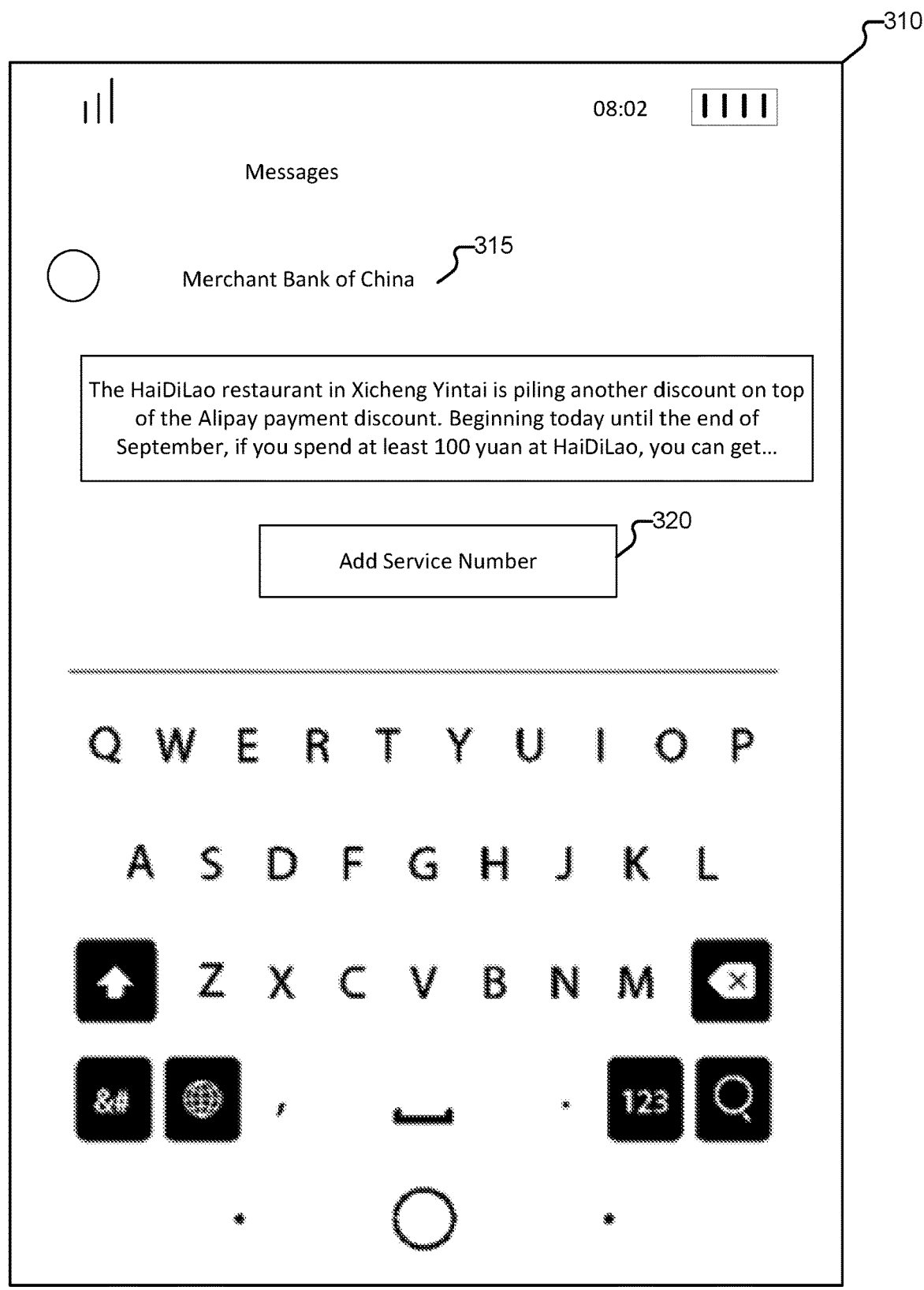
FIG. 3A is a diagram of an interface for pushing service account association information according to various embodiments of the present disclosure.
Figure 3B:
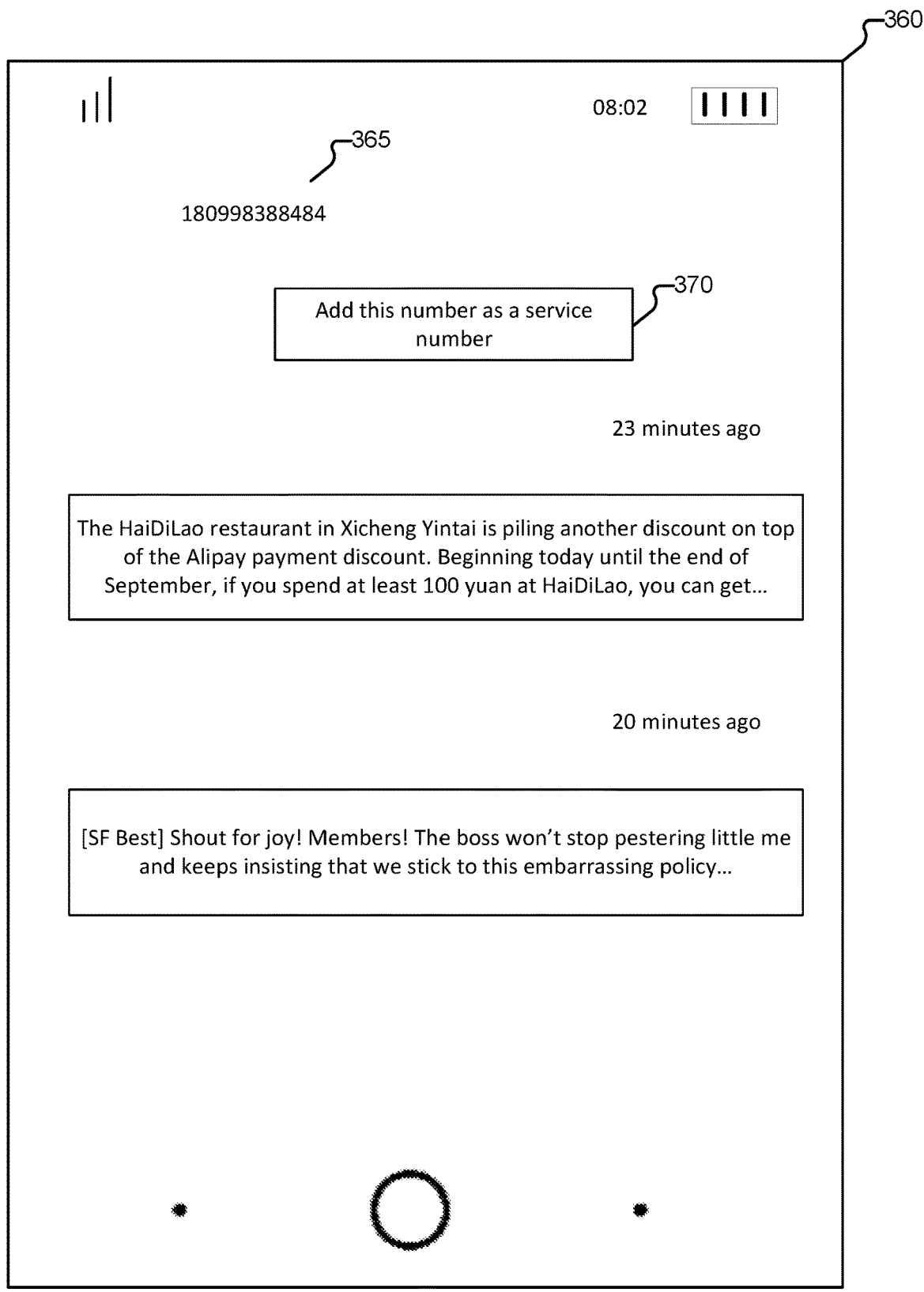
FIG. 3B is a diagram of an interface for pushing service account association information according to various embodiments of the present disclosure.

FIG. 3A is a diagram of an interface for pushing service account association information according to various embodiments of the present disclosure. FIG. 3B is a diagram of an interface for pushing service account association information according to various embodiments of the present disclosure.

Referring to FIGS. 3A and 3B, interface 300 and interface 350 are provided. Interface 300 and/or interface 350 can be implemented in connection with process 200 of FIG. 2, interface 300 of FIG. 3A, interface 350 of FIG. 3B, and/or process 400. Interface 300 and/or interface 350 can be implemented at least in part by system 500 of FIG. 5 and/or computer system 600 of FIG. 6. In some embodiments, Interface 300 and/or interface 350 is implemented on a terminal such as such as a mobile phone, a tablet computer, a smart wearable device, or a computer.

As illustrated in FIG. 3A, interface 300 is provided on screen 310. Screen 310 can be displayed by the terminal. Interface 300 can be provided in connection with obtaining event data from a search application. Interface 300 can provide information (e.g., "China Merchants Bank") 315. For example, in response to a search function on the search application, information 315 can be displayed. Information 315 can be determined to be event data. For example, in response to a search function, event data associated with information 315 is obtained. Information 315 can be determined to be a keyword type. For example, a trigger type of the event data (e.g., "China Merchants Bank") is determined to be the keyword type. The terminal (or the search application) determines that the event data (e.g., "China Merchants Bank") corresponds to trigger data. In response to determining that the event data corresponds to trigger data, the terminal provides service account association information corresponding to the trigger data. For example, as illustrated on interface 300, the service account association information is provided via the search application to the user. A service account association setup instruction can be obtained in connection with selection of element 320. Element 320 can correspond to a button displayed on interface 300. In response to selection of element 320 (e.g., by the user), the service account association setup instruction is obtained. Selection of element 320 can correspond to an instruction to use the service account association information to associate the terminal or the application with a service account. Element 320 can be associated with service account association information provided to the user (e.g., the identifier displayed at information 315).

As illustrated in FIG. 3B, interface 350 is provided on screen 360. Screen 360 can be displayed by the terminal. Interface 350 can be provided in connection with obtaining event data from a messaging application. Interface 350 can provide information (e.g., "180998388484") 365. For example, in response to a messaging function (e.g., receipt of a message, sending of a message, etc.) on the messaging application, information 365 can be displayed. Information 365 can be determined to be event data. For example, in response to a messaging function, event data associated with information 365 is obtained. Information 365 can be determined to be a phone number type. For example, a trigger type of the event data (e.g., "180998388484") is determined to be the phone number type. The terminal (or the messaging application) determines that the event data (e.g., "180998388484") corresponds to trigger data. In response to determining that the event data corresponds to trigger data, the terminal provides service account association information corresponding to the trigger data. For example, as illustrated on interface 300, the service account association information is provided via the search application to the user. A service account association setup instruction can be obtained in connection with selection of element 370. Element 370 can correspond to a button displayed on interface 350. In response to selection of element 370 (e.g., by the user), the service account association setup instruction is obtained. Selection of element 370 can correspond to an instruction to use the service account association information to associate the terminal or the application with a service account. Element 370 can be associated with service account association information provided to the user (e.g., the phone number displayed at information 365).

According to various embodiments, a service account association setup instruction is obtained. The service account association setup instruction comprises an application identifier and is received from the user. In response to receiving the service account association setup instruction, a connection is established with the application corresponding to the application identifier via a preset interface. Interface parameters provided by the application are received while the user is using the application. The interface parameters comprise the event data. Pre-stored association mapping relationships can serve as a basis for determining whether the event data is trigger data corresponding to the trigger type associated with the event data. If the event data corresponds to the trigger data, then the service account association information is communicated in connection with the broadcast message. For example, the service account association information is embedded in the extension field of the broadcast message and the broadcast message is provided to the user. Thus, users can efficiently and flexibly associate service accounts in real time while the users are using terminal applications. Various embodiments further raise processing efficiency and flexibility and avoid wasting processing resources.

Figure 4:
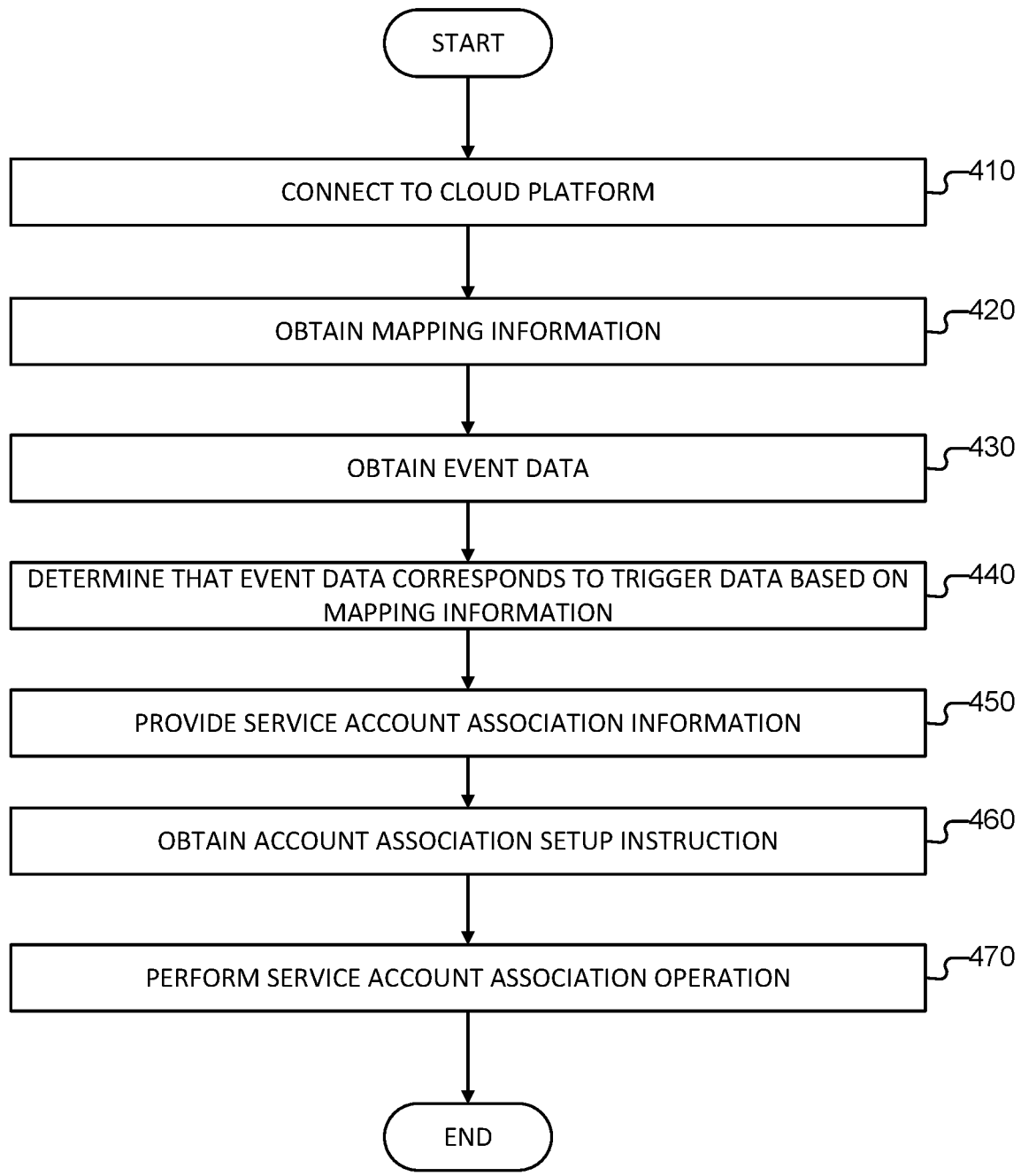
FIG. 4 is a flowchart of method for associating a service account according to various embodiments of the present disclosure.

FIG. 4 is a flowchart of method for associating a service account according to various embodiments of the present disclosure.

Referring to FIG. 4, process 400 is provided. Process 400 can be implemented in connection with process 100 of FIG. 1, process 200 of FIG. 2, interface 300 of FIG. 3A, and/or interface 350 of FIG. 3B. Process 400 can be implemented at least in part by system 500 of FIG. 5 and/or computer system 600 of FIG. 6. In some embodiments, process 400 is implemented on a terminal such as such as a mobile phone, a tablet computer, a smart wearable device, or a computer.

At 410, a connection to a cloud platform is established. The terminal can connect to one or more servers via a network to establish a connection the cloud platform. The cloud platform can correspond to one or more services provided by the one or more servers. The terminal connects to the cloud platform according to a predefined interval, at predefined times, etc. In some embodiments, the terminal connects to the cloud platform in response to a triggering event to update mapping information stored locally at the terminal (e.g., in response to a user requesting to update the mapping information, in response to an update of an application on the terminal, etc.). In some embodiments, an application running on the terminal connects to the cloud platform. For example, the application connects to the cloud platform in response to being activated (e.g., open).

In some embodiments, the cloud platform stores mapping information associated with one or more service providers. For example, one or more service providers can register with the cloud platform and store mapping information (e.g., associated with a service or an application) on the cloud platform. The mapping information can comprise mappings of trigger type, trigger data, and service account association information.

At 420, mapping information is obtained. The terminal can obtain the mapping information from the cloud platform. For example, the terminal can obtain mapping information associated with a particular application, a particular service, etc. The mapping information can comprise a mapping of characteristics associated with reference information to trigger types, a mapping of applications to attributes, a mapping of event data to trigger data, a mapping of event data to trigger type, a mapping of trigger type to trigger data, and/or a mapping of service account association information to trigger data.

According to various embodiments, in connection with providing service account association services that are provided by different service providers, service account registration functions are provided for each service provider by establishing a cloud platform. The service providers register mapping information on the cloud platform. The mapping information comprises: trigger type, trigger data, and correspondences with service account association information. In some embodiments, to adapt to the updating needs of mapping information, the mapping information compiled using the dynamic language JavaScript. The mapping information can be complied or configured according to other languages or formats. For example, the mapping information for China Merchant Bank is as shown below:

```
Trigger type   Trigger rule
phoneNum       If(phoneNum == 95555){
                  return {ID:1,name: 'China Merchant Bank'};
               }
```

In the above example, the trigger type is "phoneNum," (e.g., phone number type); the trigger rule comprises the trigger data "If(phoneNum==95555)" and service account association information "return {ID:1,name: 'China Merchant Bank'}".

The cloud platform establishes association mapping relationships based on mapping information registered by at least one service provider. These association mapping relationships comprise: at least one piece of mapping information.

The cloud platform can provide (e.g., communicate) the mapping information (e.g., a mapping relationship) to the terminal. For example, when the cloud platform establishes a connection with at least one terminal, the cloud platform issues the association mapping relationships via the connection to the terminal in order to store the mapping relationships on the terminal.

At 430, event data is obtained. The event data can be obtained in connection with occurrence of a triggering event. For example, the event data can be obtained in response to a triggering event that occurs while an application is running on a terminal. The triggering event can comprise a selection of event data being displayed, a click on (or within a predefined proximity) of event data being displayed, etc. In the case of an instant messaging application, etc., the triggering event can correspond to the receipt of a communication (e.g., information) from another terminal or user.

The event data can correspond to one or more trigger types. For example, the event data can indicate the one or more trigger types with which the event data is associated. As another example, the one or more trigger types can be determined based at least in part on a formatting of the event data. As another example, the event data can comprise, or otherwise be associated with, metadata that indicates the one or more trigger types to which the event data corresponds.

At 440, the event data is determined to correspond to trigger data. For example, the event data is determined to correspond to trigger data based at least in part on the obtained mapping information. In some embodiments, the terminal determines whether the event data corresponds to the trigger data. An application such as the application associated with the event data (e.g., the application that generated or obtained the event data) can determine whether the event data corresponds to trigger data.

The predefined trigger data can correspond to trigger data matching the one or more trigger types associated with the event data.

In some embodiments, the determination of whether data corresponds to predefined trigger data is based at least in part on a mapping of event data to trigger data. In some embodiments, the determination of whether data corresponds to predefined trigger data is based at least in part on a mapping of trigger type to trigger data. The trigger type can be determined based on the event data such as using a mapping of event data to trigger type.

At 450, service account information is provided. The service account information can be provided in response to the determination that the event data corresponds to trigger data.

As an example, the service account association information that is provided corresponds to the predefined trigger data (e.g., to which the event data corresponds). In some embodiments, the terminal provides the service account association information to a user of the terminal. For example, the terminal displays the service account association information. In some embodiments, the terminal provides the service account association information to one or more servers (e.g., one or more servers associated with a service platform such as a public platform). The terminal can communicate the service account association information to the one or more servers via a network such as the Internet. The one or more servers can use the service account association information to provide the terminal or the application with one or more services.

According to various embodiments, 430 of process 400 corresponds to 110 of process 100, 440 of process 400 corresponds to 120 of process 100, and/or 450 of process 400 corresponds to 130 of process 100.

At 460, a service account association instruction is obtained. The terminal can obtain an input from a user that corresponds to an instruction to use the service account association information to associate the terminal or the application with a service account. The service account can correspond to an account associated with a service provided by one or more servers (e.g., a platform). In response to receiving the instruction to use the service account association information to associate the terminal or the application with a service account, the terminal (or the application running on the terminal) communicates a service account association setup instruction to one or more servers (e.g., via one or more networks). The one or more servers can be associated with a service (e.g., a web service) such as a service provided by a public platform.

At 470, a service account association operation is performed. The service account operation can be performed in response to receiving the service account association setup instruction. In some embodiments, the terminal performs the service account association operation.

In some embodiments, if a user receives service account association information through an application interface while using the application and wants to associate the service account, the user provides an association instruction based on the service account association information. Because service account association information can be represented in many forms (e.g., service account QR code icon, service account link, and icon for adding service accounts), one or more service account association information can selected according to the specific context of the application. For example, a user can click on the service account association information or can scan the service account association information and thus send an association instruction.

In response to the terminal receiving the service account association setup instruction from the user according to the service account association information, an association operation based on the association instruction is performed on the service account. Various methods can be performed in connection with performing the service account association operation. For example, the particular method or operation for performing the service account association operation can be based on the application, user settings, terminal settings, user preferences, etc. Two particular examples of methods for performing the service account association operation are provided below.

Method 1: Front-End Interface Association Operation

The service account association setup instruction provided by the user serves as a basis for jumping to (e.g., the terminal switching to display) the association interface corresponding to the service account association information. The user can performs a service account association operation on the association interface. For example, in the case of interface 350 of FIG. 3B, in response to selection of element 370, the terminal can display an interface with which the user can add the number to the user's contacts, etc. As example, in the case of interface 350 of FIG. 3B, in response to selection of element 370, the terminal can display an interface with which the user can add the number to the service account for the user in connection with the service provided by the cloud platform, etc. In response to successful association in accordance with the service account association operation, an association successful response provided to the user. For example, an association successful response is provided through the association interface to the user. The application on the terminal can send a request to the service account on the platform to request services or information. Thus, through the public platform on which the service account is located, the user can receive information sent by, and services provided by, the service provider corresponding to the service account.

Method 2: Back-End Association Operation

Back-end association operations complete service account associations using a back-end method. For example, in response to the terminal receiving the service account association setup instruction from the user, a preset interface between the application and the service account public platform can be used to transmit the service account association setup instruction. In response to successful association in accordance with the service account association setup instruction, an association successful response is provided via a broadcast message. As an example, the broadcast message can be provided by a cloud platform. In some embodiment, the service account association setup instruction is sent directly to the application or public platform corresponding to the service account. In response to the application or public platform corresponding to the service account receiving the association instruction, the application or public platform can execute an operation to associate the event data with the corresponding service account. In contrast to the method 1 of front-end interface association operation described above, this method only requires one user operation for direct, back-end completion of the association. Accordingly, operating efficiency for associating event data with a service account is increased.

According to various embodiments, event data corresponding to a preset trigger type is obtained while a user is using a terminal application. Then association mapping relationships obtained in advance from a cloud platform serve as a basis to determine whether the event data is trigger data corresponding to the trigger type (e.g., the trigger type to which the event data corresponds). If the event data is determined to correspond to trigger data, then service account association information corresponding to the trigger data is provided. In response to receiving an association instruction provided by the user according to the service account association information, a service account association operation is performed according to the association instruction. The service account association operation associates the event data with the corresponding service account (e.g., the service account associated with the user or the terminal), or to associate a service account corresponding to event data with the user. Thus, various embodiments enable users to flexibly associate service accounts in real time while they are using terminal apps. Various embodiments improve processing efficiency, flexibility, and user loyalty.

Figure 5:
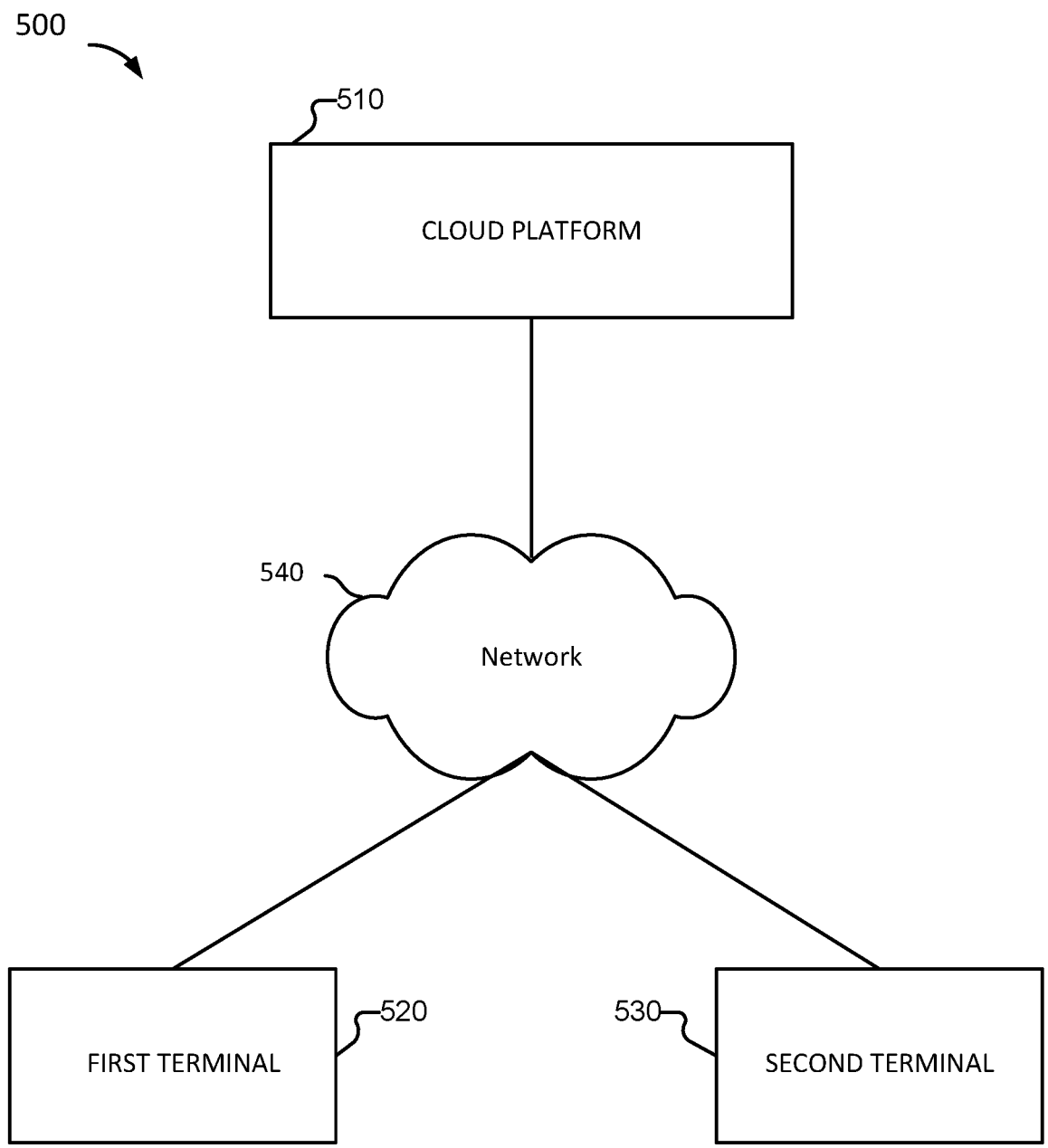
FIG. 5 is a diagram of a system for associating a service account according to various embodiments of the present disclosure.

FIG. 5 is a diagram of a system for associating a service account according to various embodiments of the present disclosure.

As illustrated in FIG. 5, system 500 is provided. System 500 can implement process 100 of FIG. 1, process 200 of FIG. 2, interface 300 of FIG. 3A, interface 350 of FIG. 3B, and/or process 400 of FIG. 4. System 500 can be implemented at least in part by computer system 600 of FIG. 6. For example, system 500 can comprise one or more computer systems 600.

System 500 comprises cloud platform 510 and first terminal 520. System 500 can further comprise second terminal 530 (or a plurality of terminals). In some embodiments, system 500 comprises network 540 over which cloud platform 510, first terminal 520, and/or second terminal 530 communicate. First terminal 520 and/or second terminal 530 can comprise means for associating service accounts. Cloud platform 510 can be implemented by one or more servers.

In some embodiments, cloud platform 510 stores mapping information associated with one or more service providers. For example, one or more service providers can register with cloud platform 510 and store mapping information (e.g., associated with a service or an application) on cloud platform 510. The mapping information can comprise mappings of trigger type, trigger data, and service account association information. Cloud platform 510 communicates mapping information to first terminal 520 and/or second terminal 530.

First terminal 520 and/or second terminal 530 can store mapping information. For example, in response to receiving mapping information from cloud platform 510, first terminal 520 and/or second terminal 530 locally store mapping information.

According to various embodiments, mapping information is registered by at least one service provider on a cloud platform. The mapping information comprises: trigger types, trigger data, and correspondences between service account association information. A connection can established by the cloud platform with at least one terminal, and association mapping relationships are communicated to the terminal. The mapping relationships comprise: at least one piece of mapping information. The terminal can store the association mapping relationships in service account-associating means.

Thus, while a user is using a terminal application, event data corresponding to a preset trigger type is acquired (e.g., through the service account-associating means). Pre-stored association mapping relationships serve as a basis for determining whether the event data is trigger data corresponding to the trigger type. If the event data is the trigger data, then service account association information corresponding to the trigger data is provided. Thus, various embodiments enable users to flexibly associate service accounts in real time while the users are using terminal apps. Various embodiments improve processing efficiency and user loyalty.

Figure 6:
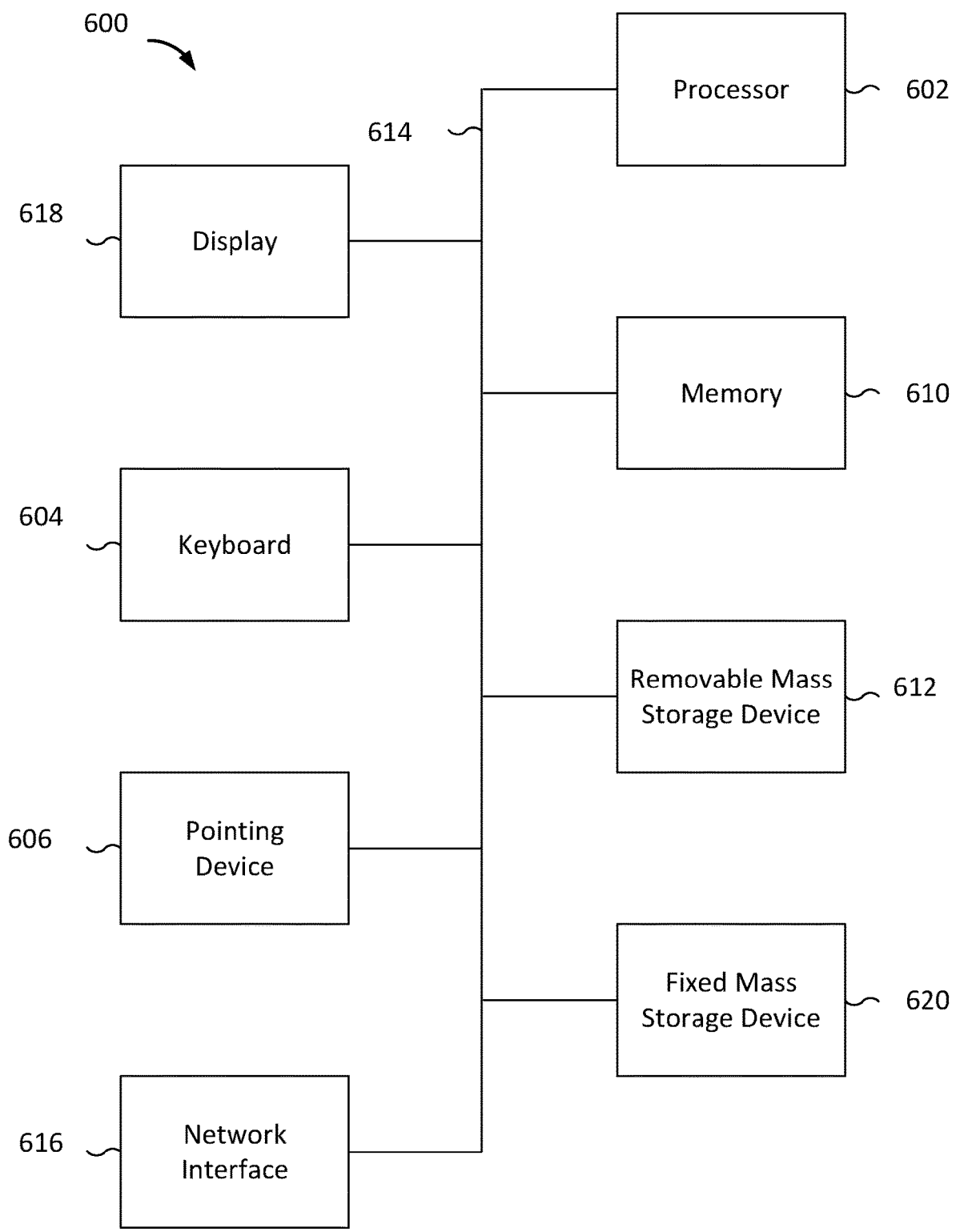
FIG. 6 is a functional diagram of a computer system for associating a service account according to various embodiments of the present disclosure.

FIG. 6 is a functional diagram of a computer system for associating a service account according to various embodiments of the present disclosure.

Referring to FIG. 6, computer system 600 is provided. Computer system 600 can be implemented in connection with process 100 of FIG. 1, process 200 of FIG. 2, interface 300 of FIG. 3A, interface 350 of FIG. 3B, process 400 of FIG. 4, and/or system 500 of FIG. 5. Computer system 600 can implement the terminal.

Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or unidirectional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

In the description of the present specification, reference to such terms as "one embodiment," "some embodiments," "an example," "a specific example," or "some examples" means that a particular feature, structure, material, or characteristic described in light of the embodiment or example is included in at least one embodiment or example of the present application. In the present specification, schematic representations of the aforesaid terms do not necessarily relate to the same embodiments or examples. Moreover, the described specific features, structures, materials, or characteristics may be suitably integrated in any one or more embodiments or examples. In addition, a person with skill in the art could take different embodiments or examples and the features of different embodiments or examples described in the present specification and, where they do not conflict with each other, integrate and combine them.

In addition, the terms "first" and "second" are for the purpose of description only and cannot be understood as indicating or implying relative importance or as implicitly expressing the quantity of an indicated technical feature. Therefore, a feature defined as "first" or "second" can explicitly or implicitly include at least one of this feature. In the descriptions of the present application, "multiple" means at least two, e.g., two, three, etc., unless otherwise clearly and particularly defined.

The flowcharts or any processes or methods otherwise described herein may be understood as representing a module, segment, or portion of executable instruction code including one or more steps for implementing specific logical functions or processes. Moreover, the scope of preferred embodiments of the present application comprises additional implementations whose functions may be performed in other than the order shown or discussed, including in a substantially simultaneous manner or in reverse order. This should be understood by persons skilled in the art associated with the embodiments of the present application.

The logic and/or steps represented in flowcharts or otherwise described herein may, for example, be considered as a sequencing list of executable instructions for implementing logical functions, which can be concretely embodied in any computer-readable medium for use in an instruction-executing system, means, or device (e.g., a computer-based system, a processor-containing system, or another system capable of fetching instructions from instruction-executing systems, means, or devices and executing the instructions) or for use in combination with instruction-executing systems, means, or devices. For purposes of the present specification, a "computer-readable medium" can be any means that can contain, store, communicate, propagate, or transmit programs for use in instruction-executing systems, means, or devices or for use in combination with instruction-executing systems, means, or devices. More specific examples (a non-exhaustive list) of computer-readable media include: electrical connectors (electronic devices) having one or more wires, portable computer disk cartridges (magnetic devices), random access memory (RAM), read-only memory (ROM), erasable programmable read-only memory (EPROM or flash memory), optical fiber devices, and portable compact disc read-only memory (CD-ROM). In addition, the computer-readable medium could even be paper or another suitable medium upon which programs may be printed. For paper or another medium may, for example, be optically scanned and then edited and interpreted or, if necessary, otherwise suitably processed to obtain the program electronically and then store it in computer memory.

Please understand that each part of the present application may be realized as hardware, software, firmware, or a combination thereof. In the embodiments described above, multiple steps or methods may be implemented by software or firmware stored in memory and executed by a suitable instruction-executing system. For example, if hardware is to be used for implementation, then, as in another embodiment, any one or combination of the following techniques well-known in the art may be used: discrete logic circuits having logic gate circuits for implementing logic functions upon data signals, specialized integrated circuits having appropriate combinational logic gate circuits, programmable gate arrays (PGA), field programmable gate arrays (FPGA), and so on.

Persons with ordinary skill in the art may understand that all or some of the steps carried in the above-described embodiment methods can be implemented by instructing appropriate hardware through programs. Said programs may be stored in computer-readable storage media. When the programs are executed, they include one or a combination of the method embodiments.

In addition, each functional unit in each of the embodiments of the present application may be integrated into a proxy, or each unit may have an independent physical existence. Or two or more units may be integrated into one module. The aforesaid integrated modules may also take the form of hardware, or they may take the form of software function modules. If said integrated modules take the form of software function modules and are sold or used as separate products, they may also be stored on computer-readable storage media.

The aforementioned storage media may be read-only memory, magnetic disks, or optical disks, etc. Although embodiments of the present application have already been presented and described above, the above-described embodiments are clearly exemplary in nature and cannot be understood as limiting the present application. A person with ordinary skill in the art may change, revise, substitute, or alter the embodiments described above within the scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors of a terminal, information in connection with execution of an application on the terminal;
    in response to receiving the information in connection with execution of the application, determining, by one or more processors of the terminal, whether the information corresponds to predefined trigger data for invoking an element to associate at least part of the information with an account, comprising:
        determining, based at least in part on a locally stored mapping of trigger data to one or more trigger types, whether at least part of the information corresponds to a trigger type for triggering association of the information with the account;
    in response to determining that the information obtained in connection with execution of the application corresponds to the predefined trigger data, providing, by one or more processors the element on an interface of the terminal, wherein the element is configured to associate the information in connection with the execution of the application with the account in response to user selection of the element; and
    in response to a determination that the element is selected, storing at least part of the information in connection with the account, wherein:
        the account is a service account of a user of the terminal with respect to a platform that provides a service to the user; and
        the service provided by the platform is different from the application on the terminal with which the information is obtained.

2. The method of claim 1, the one or more trigger types comprise at least one of:
    a telephone number type, a web address type, and a keyword type.

3. The method of claim 1, the element comprises at least one of the following:
    a service account QR code icon, a service account link, and an icon for adding service accounts.

4. The method of claim 3, wherein the element is displayed to a user on a screen of the terminal.

5. The method of claim 1, wherein the obtaining of the information comprises:
    obtaining real-time information from one or more interactions while the user is using the application; and
    obtaining the information corresponding to the one or more trigger types based at least in part on filtering the real-time information according to a preset screening process.

6. The method of claim 5, wherein the preset screening comprises at least one of the following:

a regular expression, a semantic analysis process, and cluster analysis process.

7. The method of claim 1, wherein the obtaining of the information comprises:
establishing, by one or more processors, a connection between an operating system of the terminal and the application through a preset interface;
obtaining, by the operating system of the terminal, one or more interface parameters from the application, the one or more interface parameters comprising: the information.

8. The method of claim 1, wherein the providing the element comprises:
embedding, by one or more processors, service account association information corresponding to the element in an extension field of a broadcast message; and
providing, by one or more processors, the broadcast message to a user of the terminal.

9. The method of claim 1, further comprising:
obtaining, by the terminal, mapping relationships from a cloud platform over a network, wherein the cloud platform stores mapping information registered by one or service providers, the mapping information comprising relationship information associated with one or more of a trigger type, trigger data, and relationships with service account association information, and the mapping relationships obtained from the cloud platform comprising at least one piece of mapping information.

10. The method of claim 1, further comprising
receiving an association instruction from a user according to selection of the element;
wherein the storing the at least part of the information comprises performing a service account association operation based at least in part on the association instruction.

11. The method of claim 10, wherein the performing the service account association operation based at least in part on the association instruction comprises:
providing an association interface based at least in part on the association instruction;
obtaining an input to the association interface from the user in connection with a request to perform the service account association operation to be performed; and
providing an association successful response via the association interface.

12. The method of claim 10, wherein the performing the service account association operation based at least in part on the association instruction comprises:
communicating the association instruction and an association successful response via a broadcast message, wherein the association instruction and the association successful response are communicated via a preset interface between the application and a service account platform; and
communicating the association instruction to the service account platform or application corresponding to a service account to instruct the service account platform or application corresponding to the service account to execute an operation of associating the service account according to the association instruction.

13. The method of claim 1, further comprising:
receiving an account association setup instruction from the user of the terminal, the setup instruction comprising: at least one application identifier, wherein the at least one application identifier is used to obtain information corresponding to a preset trigger type while the user is using the application corresponding to the application identifier.

14. The method of claim 1, further comprising:
obtaining, by the one or more processors, a service based at least in part on the service account, wherein:
the service is provided by one or more servers to the terminal via a network; and
the storing the at least part of the information in connection with the account comprises associating the service account with the terminal based at least in part on the information.

15. The method of claim 1, wherein the predefined trigger data is formatted to correspond to at least one of the one or more trigger types.

16. The method of claim 1, wherein the predefined trigger data complies with syntax for one or more trigger types.

17. A device, comprising:
one or more processors configured to:
obtain information in connection with execution of an application on the device;
in response to receiving the information in connection with execution of the application, determine whether the information corresponds to predefined trigger data for invoking an element to associate at least part of the information with an account, comprising:
determine, based at least in part on a locally stored mapping of trigger data to one or more trigger types, whether at least part of the information corresponds to a trigger type for triggering association of the information with the account;
in response to determining that the information obtained in connection with execution of the application corresponds to the predefined trigger data, provide the element on an interface of the device, wherein the element is configured to associate the information in connection with the execution of the application with the account in response to user selection of the element; and
in response to a determination that the element is selected, store at least part of the information in connection with the account, wherein:
the account is a service account of a user of the device with respect to a platform that provides a service to the user; and
the service provided by the platform is different from the application on the device with which the information is obtained; and
one or more memories coupled to the one or more processors, configured to provide the one or more processors with instructions.

18. A system, comprising
a terminal comprising:
one or more processors configured to:
obtain information in connection with execution of an application on the terminal;
in response to receiving the information in connection with execution of the application, determine whether the information corresponds to predefined trigger data for invoking an element to associate at least part of the information with an account, comprising:
determine, based at least in part on a locally stored mapping of trigger data to one or more trigger types, whether at least part of the information corresponds to a trigger type for triggering association of the information with the account;

in response to determining that the information obtained in connection with execution of the application corresponds to the predefined trigger data, provide the element on an interface of the terminal, wherein the element is configured to associate the information in connection with the execution of the application with the account in response to user selection of the element; and in response to a determination that the element is selected, storing at least part of the information in connection with the account, wherein:

the account is a service account of a user of the terminal with respect to a platform that provides a service to the user; and the service provided by the platform is different from the application on the terminal with which the information is obtained; and one or more memories coupled to the one or more processors, configured to provide the one or more processors with instructions; and one or more servers for the platform, comprising:

one or more processors configured to:

store mapping information registered by one or service providers, the mapping information comprising relationship information associated with one or more of a trigger type, trigger data, and relationships with service account association information; and provide mapping relationships to the terminal; and one or more memories coupled to the one or more processors, configured to provide the one or more processors with instructions.

19. A computer program product, the computer program product being embodied in a non-transitory computer readable storage medium and comprising computer instructions for:

obtaining, by one or more processors of a terminal information in connection with execution of an application on the terminal;

in response to receiving the information in connection with execution of the application, determining, by one or more processors of the terminal, whether the information corresponds to predefined trigger data for invoking an element to associate at least part of the information with an account, comprising:

determining, based at least in part on a locally stored mapping of trigger data to one or more trigger types, whether at least part of the information corresponds to a trigger type for triggering association of the information with the account; and in response to determining that the information obtained in connection with execution of the application corresponds to the predefined trigger data, providing, by one or more processors, the element on an interface of the terminal, wherein the element is configured to associate the information in connection with the execution of the application with the account in response to user selection of the element; and in response to a determination that the element is selected storing at least part of the information in connection with the account, wherein:

the account is a service account of a user of the terminal with respect to a platform that provides a service to the user; and the service provided by the platform is different from the application on the terminal with which the information is obtained.

\* \* \* \* \*

UNITED STATES PATENT AND TRADEMARK OFFICE
CERTIFICATE OF CORRECTION

| | | |
|---|---|---|
| PATENT NO. | : 10,911,565 B2 | Page 1 of 1 |
| APPLICATION NO. | : 15/950915 | |
| DATED | : February 2, 2021 | |
| INVENTOR(S) | : Zhijun Yuan, Xuyan Chi and Kan Xu | |

It is certified that error appears in the above-identified patent and that said Letters Patent is hereby corrected as shown below:

In the Claims

In Column 22, Line(s) 34, Claim 1, after "processors", insert --,--.

In Column 23, Line(s) 31, Claim 10, after "comprising", insert --:--.

In Column 24, Line(s) 52, Claim 18, after "comprising", insert --:--.

In Column 26, Line(s) 1, Claim 19, after "terminal", insert --,--.

In Column 26, Line(s) 24, Claim 19, after "selected", insert --,--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*